United States Patent [15] 3,687,028
Rentschler [45] Aug. 29, 1972

[54] PHOTOGRAPHIC CAMERA WITH FLASH MECHANISM

[72] Inventor: Waldemar T. Rentschler, Schwarzwald, Germany

[73] Assignee: Prontor-Werk Alfred Gauthier, G.m.b.H., Calmbach/Schwarzwald, Germany

[22] Filed: Dec. 10, 1970

[21] Appl. No.: 96,900

[30] Foreign Application Priority Data

Dec. 12, 1969 Germany..........P 19 62 292.5

[52] U.S. Cl...............95/11 R, 95/11.5 R, 95/10 C, 95/53 E
[51] Int. Cl...........................................G03b 9/58
[58] Field of Search....95/11 R, 11.5 R, 10 C, 10 CT, 95/53 E, 53 EA, 53 EB

[56] References Cited

UNITED STATES PATENTS

| | | | |
|---|---|---|---|
| 3,438,314 | 4/1969 | Wagner | 95/53 E |
| 3,504,602 | 4/1970 | Kiper et al. | 95/10 C |
| 3,555,985 | 1/1971 | Ueda et al. | 95/10 C |
| 3,507,196 | 4/1970 | Ruhle et al. | 95/53 EB |
| 3,338,145 | 8/1967 | Rentschler et al. | 95/64 R |

*Primary Examiner*—Samuel S. Matthews
*Assistant Examiner*—Robert P. Greiner
*Attorney*—March, Le Fever & Wyatt

[57] ABSTRACT

A photographic camera has a constant aperture objective lens, focussed by means of a range finder, and a shutter. The shutter includes a timing device which gives at least two exposure times, one of which utilizes all the light of a flash bulb, for example, and another using only a part of the light. An exposure time setting mechanism is operable on the timing device. The range finder coacts with a flash-time setting mechanism which, in turn, acts on the timing device. The exposure time setting device has a special flash setting and, when at this setting, the exposure time setting mechanism is ineffective on the timing device. The flash-time setting mechanism is cooperable with the range finder and, when the exposure time setting mechanism is in the flash setting position, the flash-time setting mechanism is effective on the timing device in accordance with the setting of the range finder, so that a short range setting of the range finder causes the flash-time setting mechanism to act on the timing device to provide a shorter exposure time, and a long range setting of the range finder causes the flash-time setting mechanism to operate the timing device to provide a longer exposure time.

6 Claims, 8 Drawing Figures

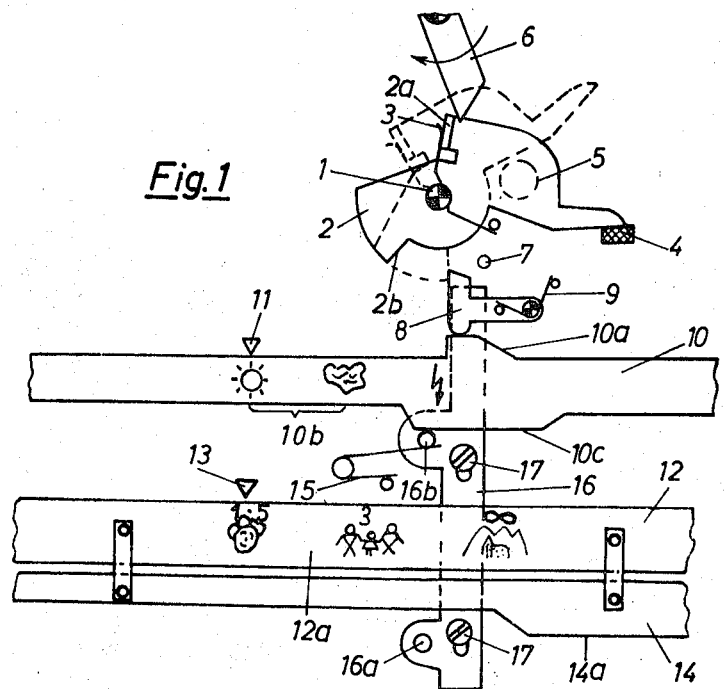
*Fig.1*
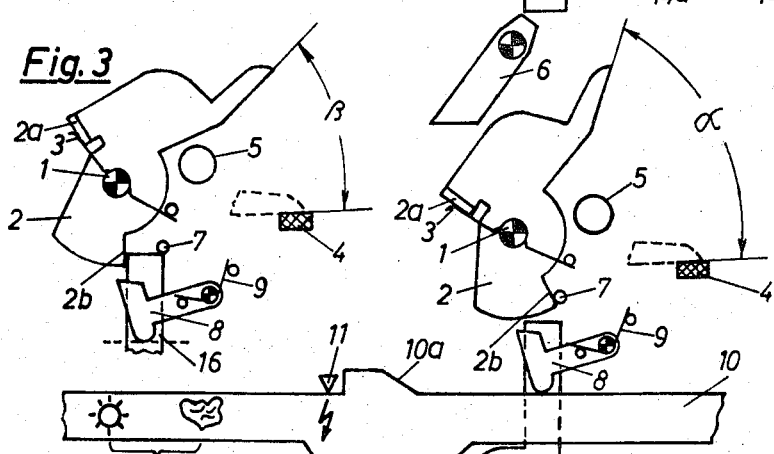
*Fig.3*  *Fig.2*
INVENTOR
Waldemar T. Rentschler
BY
Arthur A. March
ATTORNEY

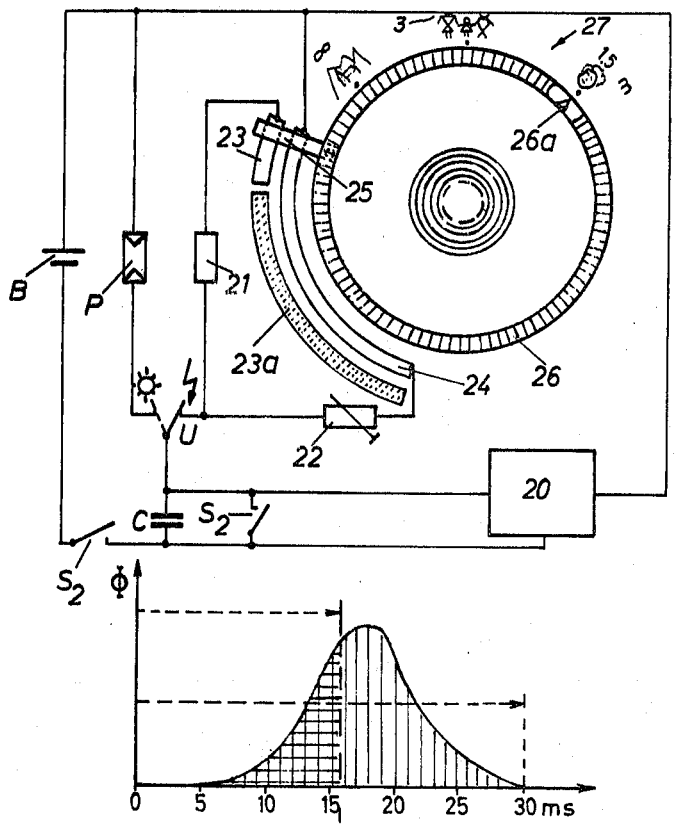
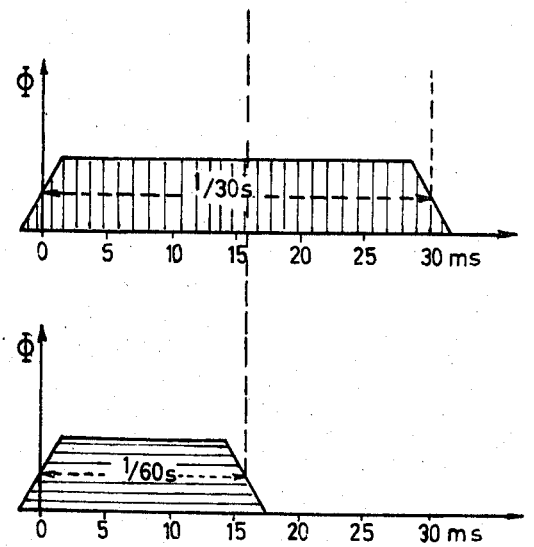
Fig. 4
Fig. 5

INVENTOR
Waldemar T. Rentschler
BY
Arthur A. March
ATTORNEY

PHOTOGRAPHIC CAMERA WITH FLASH MECHANISM

This invention relates to a photographic camera incorporating an objective lens focussed by means of a range setter and having a constant aperture, together with a shutter comprising a timing device giving at least two exposure times, one exposure time which is long enough to admit substantially all the light radiated by a flash bulb and reflected from a subject, and the other which is shorter, preferably of approximately half the duration of the first.

For the correct exposure of flash light photographs, it is necessary to keep the amount of light reaching the film substantially constant, i.e., in dependence on the range finder setting. This is usually effected by setting the diaphragm aperture in accordance with the co-efficient of permeability (Guide number) $L = $ aperture $x$ range. To facilitate the handling of the camera, it is now the practice to couple the diaphragm setting with the range setter or focussing means, so that the aperture is automatically set by the range setter for flash.

However, cameras in the low price bracket are in many cases not provided with an adjustable iris diaphragm, but only with an objective lens of comparatively low numerical aperture, e.g., F8 while, for the purpose of ensuring the correct focus for the object to be photographed, two or three range values, usually characterized by symbols, are provided. Owing to the absence of an adjustable aperture it is not possible, however, to compensate for range, with these cameras, by means of the aperture. In the directions for using such a camera, people are instructed that flash light photographs should be taken within a certain restricted range, e.g., 1.5 m to 3 m. It is usually the case that, with the maximum range of 3 m, normal exposure of the negative results, while shorter ranges may give over-exposed results. This is unavoidable in relatively low priced cameras, but seeing that black and white films are frequently used in such cameras, which may be over-exposed by as much as two stops, acceptable photographs still result. In view of the increasing use of color films in low priced cameras, the above described condition is a real defect, since the latitude in the exposure of color film is much less than in the case of black and white film. This defect is particularly apparent in the case of portrait photographs, because the range is usually only about 1.5 m, while as natural a color reproduction as possible is required if these photographs are to be approved by the persons photographed.

In this connection it should be noted that cameras of the above kind generally have only two exposure times, one of which is intended for "sunshine photography" and the other both for exposure with "cloudy sky" and also for flash light. These exposure times normally differ by a factor of 2, the objective lens having a constant diaphragm aperture but focussable to different ranges by means of a range setter, e.g., to the settings "portrait," "group" and "landscape."

SUMMARY OF THE INVENTION

The present invention has for an object the adaptation of a camera of the type described to flash photography without additional expense and without making the operation of the camera more difficult; in particular, without adding a diaphragm and the necessity of setting said diaphragm.

According to the present invention there is provided a photographic camera incorporating a constant aperture objective lens focussed by means of a range finder, or setter, and a shutter. The shutter comprises a timing device giving at least two exposure times, one exposure time using the full light emission of a flash bulb and the other only part thereof. The range setter is connected to a flash-time setter acting on the timing device. The setter used for the exposure time setting has, in addition to the settings corresponding to the various exposure times, a special "flash" setting. At this setting, the effect of the exposure time setter is cancelled and, in its place, only the flash-time setter, connected to the range finder, is effective on the timing device, and operates in such manner that a short exposure time is associated with a short range and a longer exposure time is associated with a longer range. This makes it possible to use a longer or shorter duration of the light radiated from a flash bulb in dependence on the range setting; that is, out of the light-beam-time diagram of a flash bulb, (see FIG. 5.) a streak of lesser (horizontally hatched) or larger, (vertically hatched) width, is cut out.

An advantage of the invention resides in the possibility of providing comparatively simple cameras with objective lenses of greater aperture than hitherto. Owing to the optical quality of many inexpensive objective lenses, it is quite possible to work with an aperture of F 6.3, so that a camera with such a lens could be used in duller conditions of ambient light. In view of flash photography and the absence of an adjustable iris diaphragm, it has hitherto not been possible to operate at a maximum aperture of F 8 since otherwise, in the case of close-up flash exposure, the resultant overexposure would be intolerable. Thus, due to the invention, not only is an automatic system provided for correctly exposing flash photos, but there is also the possibility of improving cameras of the type concerned, i.e., those which are provided with an objective lens having a constant diaphragm aperture, as regards their daylight range of use. It should be noted that only slight additional expenditure on construction is necessary, and that the operation of a camera with the features of the present invention requires no different and no extra manipulations beyond those necessary with previously known cameras, and that the exposure times (at least two), provided in the types of previously known cameras, can also be used for flash light photography in addition to daylight photography.

BRIEF DESCRIPTION OF THE DRAWINGS

Further details of the present invention can be seen from the following description and drawings: in which, FIG. 1 shows a mechanically actuated camera shutter in a diagrammatic form combined with the exposure setting means in the positions for short-exposure daylight photography, with the shutter blade shown closed (full lines) and open (broken lines).

FIG. 2 shows the same arrangement as in FIG. 1, the setting means being changed over to the position for long duration flash exposures.

FIG. 3 shows a shutter blade and the stops serving to limit its deflection, in a position which the stops assume after being set to the shortest possible flash time.

FIG. 4 shows a camera shutter with an electronic timer with time control dependent on daylight lighting conditions, with an extra switch by which the camera is switched over to flash when the timing is effected by means of fixed resistors.

FIG. 5 shows two shutter time diagrams for 1/30 th and 1/60th sec., compared with the luminous flux output $v$ time diagram of a conventional flashbulb.

DESCRIPTION OF THE PREFERRED EMBODIMENTS

Figure 6:
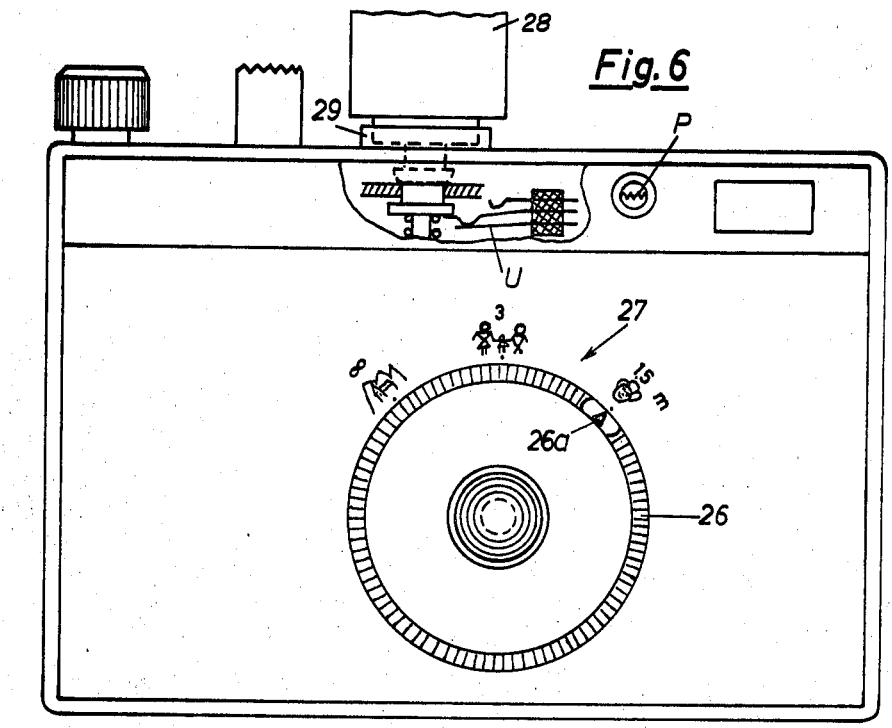
FIG. 6 is a front view of a camera fitted with an electronically timed shutter and having a flash cube mounted in a position of readiness, suitable for carrying out flash exposures.

The invention will first be described with reference to the embodiments shown in FIGS. 1 - 3 which show a shutter having a mechanical timing device, namely a so-called inertia shutter. With this shutter, different exposure times are achieved by a greater or lesser limitation of the movement of the shutter blade system reciprocating during the exposure process, by means of reflex stops. As shown in FIG. 1, the shutter blade 2 is rotatably mounted on a stationary pin 1, and is held in contact with a stationary end stop 4 in its starting position by a return spring 3. From this starting position the shutter blade 2 is driven to open the exposure aperture 5 by the arm 6 executing a rotation in the direction of the arrow, while the free end thereof, acting temporarily on a lug 2a formed on the side of the shutter blade, imparts to the blade so much kinetic energy that, after the disengagement of the parts from each other, the blade swings further round the axis 1 until it finally strikes against one of the reflex stops to be described in greater detail hereinafter, at a position shown in FIG. 1 by broken lines. The stop halts the shutter blade, which rebounds back to its starting position. As already indicated above, in the case of the embodiment shown in FIGS. 1 - 3 (two exposure times of 1/30th and 1/60th sec.), different exposure times are formed by the co-operation of a stop edge 2b, provided on the shutter blade 2, and various stops causing the blade to rebound after reaching the opened position: e.g., a fixed reflex stop 7 (long exposure time of 1/30th sec.) and a displaceably mounted reflex lever 8 (short exposure time 1/60th sec.). The arrangement of the reflex stops 7 and 8 is such that the stop 8 causes the return of the shutter blade 2 sooner than the stop 7 and consequently gives the shorter time. To effect the setting of the reflex lever 8, which is biassed by a spring 9, an exposure time setter 10 is provided with, in addition to a control edge 10a co-operating directly with the lever 8, has a scale 10b with a sun symbol and a cloud symbol (short and long exposure time 1/60th and 1/30th sec.), the appropriate symbol of which is made to coincide with a stationary mark 11 for the purpose of setting the exposure time.

The camera has an objective lens of a constant aperture F 5, and a range setter 12 which is provided with a scale 12a carrying portrait, group and landscape symbols which are appropriately set opposite a mark 13. In the embodiment of FIGS. 1 - 3, a range setting of 1.5 m results from setting to the portrait symbol of the setter 12, a range setting of 3 m to the group symbol and finally, a range setting "∞" (infinite) to the landscape symbol. As may also be seen from FIGS. 1 and 2, the setter 10 serving for the exposure time setting has an additional setting "flash" characterized by a flash symbol, in addition to the two symbols provided for time pre-selection in daylight, the flash timing being the same as for "cloudy." In this position, i.e., during the taking of flash photographs, the range setter 12 takes over the function of the exposure time setter and for this purpose is fixed to a flash time setter 14. The latter has a stepped control edge 14a acting on a slide 16 biased by a spring 15. This slide is displaceably guided by screws 17, and has a driving pin 16a located in the range of operation of the control edge 14a, and another driving pin 16b co-operating with a control edge 10c additionally provided on the exposure time setter 10. It is the object of this control edge to keep the slide 16 which, instead of the lever 8, sets the short time (1/60th sec.) during the taking of flash photographs, out of the path of the stop edge 2b of the shutter blade 2 in all the exposure time settings in the daylight range. When photographing in daylight, either the lever 8, moved by the control edge 10 into its short exposure time position, or the stationary reflex stop 7 (long exposure time), comes into action.

If, however, as shown in FIG. 2, the exposure time setter 10 is changed over from the setting shown in FIG. 1 to the setting "flash" for the purpose of carrying out flash photographs and also the "group" symbol of the range setter 12 or flash time setter 14 is moved to the stationary mark 13, these setting operations result in a movement both of the reflex stop 8 and also of the slide 16 away from the path of the stop edge 2b of the shutter blade 2. This means that, during the subsequent exposure, the shutter blade traverses the full range of deflection (angle α) until it is caused to return to its starting or closed position by rebound from the stationary stop 7. The range setting of 3m suitable for carrying out group photographs by flash is then paired with the longer exposure time, which is necessary for the full exposure of such photographs.

If the photographer then wishes to change over to a head-and-shoulders (portrait) photograph with artificial lighting, he has only to change the range setter 12 and flashlight setter 14 to a shorter range, for example 1.5 m. With this setting operation, the slide 16, biased by the spring 15 and supported on the flash time setter 14 by means of the driving pin 16a, follows the curve of the control edge 14a so that the end of the slide facing the shutter blade, as shown in FIG. 3, moves into the path of the stop edge 2b of the shutter blade 2. The consequence of this is that the shutter blade strikes against the reflex stop after covering a shorter deflection corresponding to the angle β, whereby reversal of movement of the shutter is caused to take place earlier, and a shorter exposure time is consequently effected. This short exposure time of 1/60th sec., is paired with a range value of 1.5 m without any further action by the photographer as regards exposure setting.

The significance and the advantages of the additional flash time setter 14 for the operation of a camera are described hereinafter with reference to the diagrams in FIG. 5. These figures show, with reference to luminous flux-time diagrams, how, in the case of a given range, the quantity of light suitable for the respective exposure may be regulated by selection of a certain exposure time. In the embodiment of a shutter having a constant diaphragm setting according to FIGS. 1 – 3, it is assumed that the guide number 24 is associated with a flashbulb and with a medium film sensitivity, e.g., 18° D.I.N. and that the constant diaphragm aperture of the objective is F 8.

In this case, at a subject distance of 3 m, the full light radiation of the flash lamp is required (guide number 24 = 3m × F 8). Accordingly an exposure time is chosen with this range which allows the entire light radiation from the flashbulb to become photographically effective whilst the shutter is open. This condition is fulfilled with an exposure time of approximately 1/30th sec.

However, for a photograph of a subject at only 1.5m, a considerably smaller quantity of light is necessary, and in fact according to the guide number equation, a diaphragm aperture would result which is two steps less than in the case of a correctly exposed photograph at a range of 3m. This reduced light cannot be compensated owing to the absence of a variable diaphragm, so a much shorter exposure time must be used with the range of 1.5m than with the range of 3m. As shown in FIG. 5, this exposure time is set at approximately 1/60th sec. Again, it will be seen that, due to the much shorter exposure time, only the initial light radiation from the flashbulb is utilized for the photograph, the greater part of the light radiation occurring only after the reclosing of the shutter. This is particularly useful since flash-bulbs today are used mainly in the form of "flash cubes," and, independently of the manufacturers, have a standardized luminous flux-time diagram. This ensures that the range and exposure time pairing determined according to the invention always provides the best exposure conditions.

FIG. 4 shows a camera shutter which uses this principle but deviates therefrom merely in so far as a time control circuit is used to keep the shutter blade in the open position over a greater or shorter time interval, and including an electro-magnetic locking device for timing purposes. In the circuit shown in FIG. 4 a battery is indicated by B and a switch by $S_1$, the latter connecting the time control circuit to the battery voltage. In the circuit of the timing device there is a photoresistor P, a capacitor C and a charging and starting switch $S_2$ starting the timing process in the relaxation oscillator 20 (not shown in detail). The circuit has a changeover switch U by means of which exposure times are selected either in dependence on the ambient light by the photoresistor P, or independently of the light, by the interposition of certain resistors (to be described in greater detail hereinafter) in the timing circuit. The two alternative positions of the changeover switch U are characterized in the circuit diagram by a sun symbol and a flash symbol for greater clarity. If the changeover switch U is in the contact position "sun symbol" the exposure timing is effected in dependence on the ambient lighting conditions by way of the photoresistor P. If the switch U is changed over to the "flash symbol," the photo-resistor is replaced by resistors 21, 22. Of these two resistors, the resistor 21 is connected to a contact arc 23 and the resistor 22 to a contact arc 24. A sliding contact 25 is in resilient contact with these two arcs and is coupled at one end to the range setter 26 focussing the objective lens. The range setter 26 carries a mark 26a which, to focus the objective lens of the camera, is moved to one of the symbols of the scale 27. The symbols of this scale are equivalent to those on the scale 12a in the embodiment of FIGS. 1 and 2.

As already stated, the range setter 26 is provided with a sliding contact 25 for varying the timing circuit, this contact resting on the two arcs 23 and 24. This means that the two resistors 21 and 22 are connected in parallel in the circuit of the electronic timing device when the range setter 26 is set to 1.5 m as shown in FIG. 4, so that the exposure time of 1/60th sec. is associated with the range value 1.5 m. If the mark 26a of the range setter 26 is placed opposite the "group" symbol, the sliding contact 25 is in contact with the arc 24 and only the resistor 22 acts in the electronic timing device with this range setting of 3 m. Accordingly, an exposure time of 1/30th sec. is selected. The setting of various exposure times would also be possible by providing an individual resistor for each flash exposure time. However, the parallel connection shown has the advantage that, in an intermediate position in which a change is made from one exposure time to the other, no exposure time can be set which deviates from the desired exposure time, or an exposure time corresponding to the symbol. In particular, this makes it possible for the selected time setting to correspond with the next mark and, consequently, a clearly defined transition from one nominal exposure time to the next directly following one. The isolated arc 23a shown in FIG. 4 is intended to ensure that the contact slide 25 always moves on metal and does not come into contact with the circuit base material. This avoids interruption of contact in the transit from individual to parallel connection of the resistors.

According to the embodiment of a camera shown in FIG. 6 and having an electronic timing device, the changeover switch U, as shown in the circuit diagram of FIG. 4, is provided in the region of the holder 29 which receives a flash cube 28, to automatically switch the camera from daylight photography to flash. This is effected such that, when the flash cube is inserted, the photo-resistor P is switched off and in its place, according to the range setting, the fixed resistor or resistors are automatically switched into the circuit of the electronic timing device for the formation of the flash time associated with the particular range value. Accordingly, for taking flash photographs, it is only necessary to set the range setter 26 to one or the other symbol of the scale 27 associated therewith, to pair the range and exposure time values in the correct relation with the light given by the flash cube 28.

Figure 7:
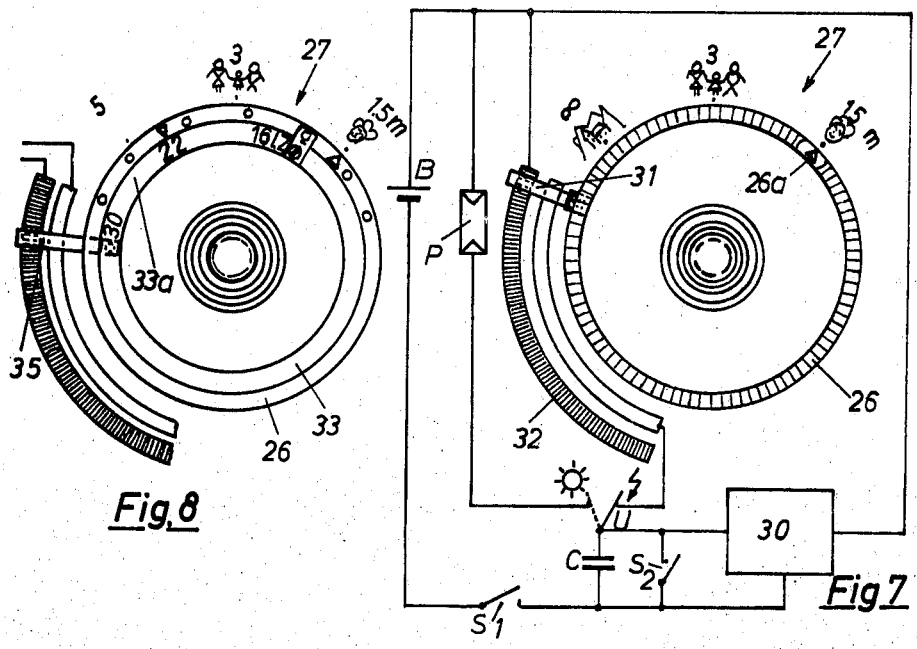
FIG. 7 shows an electronic shutter of the type illustrated in FIG. 4, but in this case having a variable resistor for changing resistance in dependence on the range finder setting.

FIG. 7 shows an arrangement corresponding to the embodiment of FIG. 4, with a shutter having an electronic timing device. The equivalent components of the two circuits concerned have the same reference letters, i.e., the battery B, the photo-resistor P, the switch $S_1$ energizing the timing device, the capacitor C, the charging and starting switch $S_2$, the changeover switch U and finally the relaxation shutter timer 30. As before, there is a setting scale 27 with range finding symbols, associated with the range setter 26.

In addition, the range setter 26 carries a slider 31 which, in the embodiment shown in FIG. 7, differs from the above described arrangement and co-operates with a variable resistor 32, formed of a carbon layer or like thick resistor film. According to the setting of the range setter 26, the resistance value of the resistor 32 varies and its variability can also be utilized for matching it to the aperture of the particular objective lens used.

Figure 8:
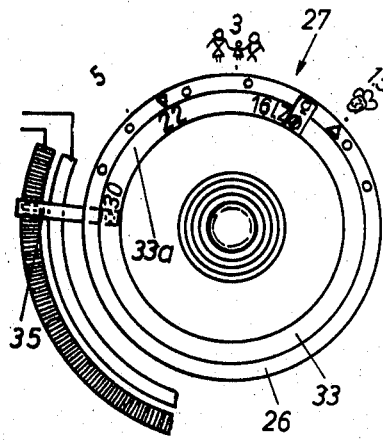
FIG. 8 shows the range setter of an electronically controlled shutter capable of being coupled with a separate setter in relative positions, said setter co-operating with a variable resistor for taking into consideration various guide numbers.

Finally, FIG. 8 shows how various guide numbers may be taken into consideration in the range setting. As is well known, the guide number varies either through the use of different kinds of flash bulb with the same film speed, or by the use of films of different speeds in conjunction with the same type of flashbulb. As shown in FIG. 8, the guide number is taken into consideration in flash photography by coupling the range or flash time setter 26 with a guide number setter 33 in various relative positions indicated in detail by a guide number scale, the contact slider 35 selecting the resistance to be included in the electronic switching circuit being secured to the guide number setter 33. It should be noted that the guide number and the associated resistance value have a linear relationship.

What is claimed is:

1. A photographic camera comprising, in combination, a constant aperture objective lens; a range setter operable to focus said lens; a shutter; a timing device cooperable with said shutter to provide at least two exposure times including a first exposure time utilizing the full light emission of a flashbulb and a second exposure time using only part of the light emission of a flashbulb; a flash-time setter operatively associated with said range setter; and an exposure-time setter normally operatively associated with said timing device and operable to set exposure times for daylight exposures, said exposure-time setter having, in addition to settings corresponding to various daylight exposure times, a "-flash" setting and, in said "flash" setting, being effectively disconnected from said timing device; said flash-time setter, when said exposure-time setter is in said "-flash" setting, being operable, responsive to setting of a short range by said range setter, to operate said timing device to provide said second exposure time and, responsive to setting of a long range by said range setter, to operate said timing device to provide said first exposure time.

2. A photographic camera according to claim 1, wherein said range setter and said flash-time setter are combined into one unit.

3. A photographic camera according to claim 2, in which said range setter is operatively associated with a guide number setter; and a guide number scale on one of said range setter and guide number setter and marks on the other of said range setter and said guide number setter to enable adjustment of the relative positions of said range setter and said guide number setter.

4. A photographic camera according to claim 1, in which said timing device is an electronically controlled timing device; a photo-resistor providing shutter time control in dependence on the ambient daylight; resistance means providing shutter time control independently of the ambient lighting; and a changeover switch selectively operable to connect either said photo-resistor or said resistance means to said timing device; said flash-time setter being connected to said range setter and operatively associated with said resistance means to select one of at least two different resistance values giving exposure times of respective different durations in the "light-independent" setting of said changeover switch, a low resistance value being associated with a short range setting of said range setter to set a short exposure time, and a higher resistance value being associated with a longer range setting of said range setter to set a relatively longer exposure time.

5. A photographic camera according to claim 4, wherein said resistance means comprises a pair of resistors connected to said changeover switch; said flash-time setter, when said range setter sets a short range, connecting both resistors in parallel with said timing device and, when said range setter sets a longer range, disconnecting one resistor from said timing device.

6. A photographic camera according to claim 4, comprising a variable resistor which varies the exposure timing and is associated said flash-time setter comprising said range setter, with a sliding contact moving over said variable resistor and coupled to rotate with the range setter.

* * * * *